United States Patent [19]
James et al.

[11] Patent Number: 5,964,660
[45] Date of Patent: Oct. 12, 1999

[54] NETWORK MULTIPLAYER GAME

[75] Inventors: Stanley R. James; Brandon D. Gillam, both of Boulder, Colo.

[73] Assignee: VR-1, Inc., Boulder, Colo.

[21] Appl. No.: 08/878,387

[22] Filed: Jun. 18, 1997

[51] Int. Cl.⁶ ..................................... A63F 9/22
[52] U.S. Cl. ................................. 463/1; 463/42
[58] Field of Search ................ 463/1; 273/236, 273/250–255, 266

[56] References Cited

PUBLICATIONS

Copyright 1998 Jason Bates PC Gamer /Stars and Planets p. 185, Apr. 1998.
Copyright 1996 Galactic Traveller Feature Xspace http:www.jacobeandemon.co.uk/xspace/features.html The Internet pp. 1–2 and 1–6, Nov. 1996.
Copyright 1999 Tim Wisseman How VGA Planets Work http:www.wilmington.netvgaplanets/howworks.htm The Internet pp. 1–10, Apr. 1999.
Copyright 1999 Dave Killingsworth/Tim Wisseman What is VGA Planets http:www.wilmington.net/vgaplanets/intro2,htm The Internet pp. 1–16, Apr. 1999.

*Primary Examiner*—Jessica J. Harrison
*Assistant Examiner*—Sheila Clayton
*Attorney, Agent, or Firm*—Holme Roberts & Owen LLP

[57] ABSTRACT

One embodiment of the present invention relates to a computer game that is played over a computer network and is capable of accommodating a large number of players. When the game is play on the Internet, players are able to input moves and be apprised of the state of the game using the basic input/output functions of their Web browser. Consequently, the game can be played with substantially no other game related software, plug-ins or add-ons. Another embodiment of the invention relates to the management of a game data base so as to compensate for the lack of game resources that a newer player has relative to older players that are likely to possess significantly greater game resources. Further, the virtual space of the game is highly expandable and updatable. In another embodiment of the invention a game is provided that couples game playing and advertising via a game currency that an advertiser can provide to a player and which can be used by the player in playing the game.

4 Claims, 3 Drawing Sheets

NETWORK MULTIPLAYER GAME

BACKGROUND OF THE INVENTION

1. Field of the Invention

The present invention relates to a computer game that is played over a computer network, such as the World Wide Web.

2. Description of the Related Art

With the growing number of people having access to a computer, computer games are becoming more widespread, especially among the younger generation. However, the development of computer graphics, and especially 3D graphics, has allowed the games to become more sophisticated. Also facilitating the emergence of more sophisticated games is the emergence of fast personal computers with more powerful CPUs and with more Random Access Memory (RAM). The more sophisticated games have, in turn, expanded the computer game market by attracting a more mature consumer base.

There are many types of computer games to be found on the market today. One way to type or classify these games is by the theme of the game. The following list sets forth a number of the themes found in computer games on the market today:

(1) 3D first-person action games, such as the "Doom" game produced by id Corp., put the player in a 3D environment where it is possible to walk, turn and react to the surrounding objects.
 (2) Adventure games and interactive fiction, such as the "Zork" game, are story based games in which the player controls a character in the game play scenario.
 (3) Edutainment games, such as the "Where in the World is Carmen Sandiego" game produced by Broderbund, merge entertainment and education. They are designed to provide the player with a learning process that is articulated through absorbing gameplay.
 (4) Fighting games, such as the "Mortal Kombat" game produced by Midway Manufacturing Company, are action oriented games. They are based on the martial arts and other fighting sports and offer a variety of characters for the player to control, each with a unique set of fighting skills.
 (5) Strategy games, such as the "SimCity" game made by Maxis Co., are also called god games because of the role played by the game player as the shaper of the system by virtue of the managing of the resources of a society. Other strategy games include chess, e.g. the ChessMaster game produced by The Fidelity ToolWorks.
 (6) Arcade-action games, such as the "1942" game, are based on the action of eliminating enemies using a theme like war, alien invasion, etc.
 (7) Simulation games, such as the "FA-18/Interceptor" game made by Electronic arts (EA), are most often associated with some form of military hardware, commonly aircraft and tanks. However, some other types of simulation games exist such as racing a car or flying a spaceship.
 (8) Sports games, such as the "NBA live", "PGA Tour golf" and "NHL Hockey" games made by EA, are very old in the gaming arena. Most of the gaming sports tend to be a simulation of actual sports like football, baseball, basketball, etc.
 (9) War games, such as the "Eastern Front 1941" game made by Chris Crawford require adherence to a set of rules creating a structured environment. One example of such an environment is a recreation of our world's history (e.g., world war I and II). A more complete and detailed description of the various game themes can be found in "The Ultimate Game Developer's Source book" by Ben Sawyer, ed. Coriolis Group Books, Inc. 1996:

Computer games can also be classified according to the number of players that can play the game. There are single player games in which only one player is involved and multiplayer games in which a plurality of players are involved. The multiplayer games can be further sub-typed according to the computer/communication architecture that is used to implement the game as follows:

(1) Multiplayer in the Same Room is the original multiplayer architecture where multiple players, usually not exceeding two, play the same game simultaneously on the same hardware. Many coin-operated arcade games use this configuration.
 (2) Multiplayer Modem Games are played with two distinct computers, each with a modem, and each connected to the other via a telephone line. Many games today offer some sort of modem-based, long-distance playing. However, as with Multiplayer in the Same Room, the number of players is generally limited to two.
 (3) Network Games allow multiple players to interact over a Local Area Network (LAN). This particular architecture is generally capable of accommodating more than two players but is still limited to a relatively small number of players, typically less than 16 players.
 (4) Remote Access Server Games are a combination of modem-to-modem games and LAN games. The players do not have to reside on the same Local Area Network, and even though it is a modem-based configuration it is not limited to a one-to-one connection, i.e. it is not limited to two players. However, these games are typically limited to 16 players. A remote-access server game has two components: a computer-game server and computer-client. Players dial up the remote game server via modems using their client software package and engage in simultaneous play with other players who have done the same.
 (5) Online Service Multiplayer Network Games are essentially structured like Remote Access Server Games. However, Online Network Games set up servers on the Internet and use the TCP/IP networking protocol to communicate with the players. Multiplayer games of this type that are presently available typically accommodate less than 100 players.

Among the multiplayer computer games available on the market, few can be played by more than 16 players at the same time. For example, "Doom", which is famous for its level of interactivity and sophisticated 3D graphics, as well as animation capabilities, can only be played by a maximum of 8 players at the same time. This game is hosted by a computer (the server), which is generally associated with one of the players and which dispatches data to the other computers (i.e. the clients or players' computers). Each computer has to load a copy of the game in its memory to minimize the size of the data packets exchanged between the server and each of the computers. The exchange of data packets is handled by protocols, in this case IPX protocol. The number of players has been limited to 8 because of the architecture of the system and the size of the data packets.

Multiplayer games can also be classified according to the time frames within which players interact with one another.

With respect to multiplayer computer games, there are "real time" games in which the state of the game is frequently updated, typically several times a second. Another type of multiplayer computer game is a "turn-based" game in which each player can study the current state of the game and enter moves over an extended and defined period of time. Generally, this period of time is on the order of hours. Upon expiration of the defined time period, the moves are processed according to the game rules and the updated state of the game is provided to the players. The genesis of such games are the Play-by-Mail games in which players in different locations submitted orders (moves) by mail to a game administrator, who then processed the moves received during a defined period of time, i.e. processed the "turn," and then sent the players a written description of the updated state of the game. "Turns" in play-by-mail games tend to be no more frequent than weekly, and are often monthly or more. An updated version of the Play-by-Mail games are the Play-by-email games in which e-mail rather than the postal service is used to convey moves and the state of the game between the players and the game administrator. Play-by-email games tend to rely heavily on the personal efforts of a central game administrator. As a consequence, these games generally support only a limited number of players—often 20 or less—and are entirely text-based.

In recent years, the Internet and, in particular, the World Wide Web portion of the Internet has experienced a rapid growth. In this regard, the Internet has begun to accommodate games. The first games to be launched on the Web were predominantly single player, interactive stories or text-based, puzzle games. More recently, a number of multi-player computer games have appeared on the Internet/Web. Examples of such games are SubSpace by Virgin Interactive Entertainment (http://www.vie.com/subspace/) and Stars! by Empire Interactive (http://beast.webmap.com/stars!/). These games also support a limited number of players, typically less than about 16. A further characteristic of such games is that each player must download or otherwise install game software to supplement the functionality of the player's web browser.

SUMMARY OF THE INVENTION

One aspect of the present invention is a centralized server that is capable of receiving moves that are transmitted over a network, relate to a turn-based game in which the move or moves of one player affect the status of another player (i.e. the players are competing against one another) and are from a plurality of players. The centralized server is a device with an address on the network that is determined prior to any players seeking to play the game. As a consequence, the players do not have to seek each other out to initiate a game. Also characteristic of the centralized server is that resources can be readily added to accommodate increasing numbers of players. In contrast, in games in which a player acts as the game master with a personal computer or the like, there is virtually no incentive for the game master to add game processing resources to accommodate more players. Hence, such games are limited in that they are not able to provide the greater dynamic associated with a large number of players. The centralized server processes the moves entered by the players to update the state of the game. Once the centralized server has updated the state of the game, it is capable of providing information relating to the updated state of the game to the players.

In one embodiment, the centralized server receives inputs from the players that have been generated by a player's use of a basic input/output device that processes inputs according to the requirements of the communication protocol(s) of the network on which the game is being played. Likewise, the centralized server transmits game information to the player that can be read by the basic input/output device. The basic input/output device for transmitting moves and receiving game information when the game is played on the World Wide Web is a web browser, such as Netscape Navigator or Microsoft Internet Explorer, which has the ability to parse HTML version 2.0 or a functional equivalent thereof. Advantageously, only the basic input/output functions of the web browser are needed to play the game, i.e. no plug-ins or add-ons are required. The moves are embedded within data packets that are formatted according to the TCP/IP protocol and the data within the packets are formatted for HTTP interpretation by the server. The centralized server stores the moves for each of the players and the current state of the game in a database. The state of the game is updated by the server and is made available to the players according to the noted formats so that the players can assess the updated state of the game and enter further moves if they so desire.

A further embodiments of the invention includes the implementation of a data base that can be expanded to accommodate an increasing number of players and certainly more than the 16–20 player limit that is prevalent in multiplayer computer games. At present, data bases have been tested that accommodate more than a hundred of players. However, it is believed that the data base does not present a meaningful limitation on the number of players. Consequently, it is conceivable that more than a thousand players can be accommodated by the data base. The data base can be structured or managed to allocate game space to players within either a fixed game space or an expanding game space.

In a further embodiment of the invention, a data base is provided for use in a game whereby the data base is managed so that players have a meaningful opportunity to play the game. In one embodiment, the data base is used in a game in which the object of the game is to acquire game "space" and in which it is desirable to let new players join the game over time. The data base is structured or managed so that an older player who is more likely to have accumulated a lot of the game resources that are used to acquire "space" does not possess an unreasonable advantage relative to a newer player who is likely to have considerably less of these resources. For example, in a game that involves the conquering of worlds ("space") within a virtual universe, it is desirable to locate a new player with a relatively small amount of the resources necessary to conquer "space" at a considerable distance from an older player who potentially has accumulated a large amount of such resources so that the newer player will not immediately be exposed to elimination by an older player that has an overwhelming resource advantage relative to the newer player. This prevents the older player from eliminating the newer player when the new player has just entered the game. It is possible to use parameters other than time. To continue with the game that involves the conquering of worlds, a density parameter can also be used in which the older players who are likely to have more game resources are located closer to one another than to newer players. It is also possible to combine or convolute a plurality of such parameters.

Another embodiment of the invention offers additional ways for players to interact with the game and with each other besides the ability to submit moves and view the resulting changes in the game universe. These include a real-time chat area, a player-to-player email system, an interactive encyclopedia describing the game's setting, and a help function offering information on how to play the game as well as tips and strategies. Regularly-updated reports on an interactive news page inform players about significant developments in the game, and player rankings show the most successful players at any time. In combination, these features have the effect of creating a virtual environment within which players can interact in many ways.

Another embodiment of the invention relates to the coupling of advertising with the playing of a computer game. To elaborate, a game is implemented in which a game currency is used in the playing of the game. The currency can take any form. For example, play money could be employed. Advertisers buy a certain amount of the game currency from the provider of the computer game and are provided with a port or gateway in the player's interface to the game that the player can be access. Once the player accesses the port, they are provided with the advertiser's product/service literature. Subsequently, the advertiser can transfer an amount of game currency to the player, who can then use the currency to play the game. For example, if the game is implemented on the World Wide Web, the advertiser can be provided with a link in the game interface that is provided to the player. The player can "click on" the link to reach the advertiser's page. After the advertiser's page has been accessed by the player, the advertiser can transfer a certain amount of game currency to the player. In one embodiment, this transfer is effected when the game provider receives an authorization signal from the advertiser indicating that a certain amount of currency should be transferred to a particular player. Alternatively, the transfer can be accomplished in a fashion that bypasses the game provider.

Typically, the advertiser will structure their page so as to obtain some kind of verification from the player that the player has actually read or otherwise been informed of the content of the advertisement before any game currency is transferred to the player. For example, the player may be required to perform some sort of verifying action, like filling out a form that presents questions to the player about the content of the advertisement. In this case, the game provider receives a signal from the advertiser indicating that there has been a verification that the player has been apprised of the advertisement and that a certain amount of game currency should be transferred to the player.

In a preferred embodiment, a limitation is placed upon the amount of game currency that any individual player can receive from advertisers. This prevents players from acquiring so much game currency from an advertiser that the fairness of the game is jeopardized. In one implementation, a player is limited to acquiring only a predetermined amount of game currency of advertiser origin over a predetermined amount of time.

In a further embodiment, the coupling of advertising with computer game playing is further enhanced by providing the player with the option to not be provided with the ability to access advertisements to obtain game currency. The game provider would provide potential players with the option of (1) playing a game in which the player has the ability to access advertisements and, if an advertisement is accessed, the possibility of obtaining game currency; or (2) playing a game in which the player is not distracted by advertisements or the ability to access advertisements. Typically, the game provider will charge a higher fee to the user for playing the game in which the player is not distracted.

A further embodiment of the invention involves the implementation of a resource based game that includes a dynamic pricing mechanism that automatically adjusts prices in response to the demand conditions created by the players. The ability exists to link other game variables dynamically to player input in other ways, according to the nature of the simulation.

Having a game state that is substantially infinitely updatable is a further feature of the invention, and can be enhanced on an ongoing basis by additions including, but not limited to, new weapons, resources and other game units, new play options, and game-world events which do not result from player actions: including, but not limited to, planned events relating to the unfolding of a background story, and unconnected events comparable to the drawing of a "chance card" in a family board game such as Monopoly.

A further characteristic of certain implementations of the invention is a game state that is persistent: it grows and changes over time, and there is no fixed beginning or end to a game. New players can join a game in progress at any time, and do not need to wait for the start of a new game. Once a game has started, it can continue indefinitely.

The potential applications of the invention include, but are not limited to, multi-user military, strategic, economic, political and other statistical simulations of all kinds and in all settings, including strategy games, educational and training simulations, and analytical, forecasting and planning tools.

A further aspect of the invention is that communications in accordance with those noted hereinabove, i.e. between a server and the players, and between the players/servers and advertisers, occur over networks. In one embodiment, the communications occur over the Internet. Consequently, one aspect of the invention is that such communications, at least from the perspective of the players and the advertisers, occur via an Internet access service provider.

DETAILED DESCRIPTION

The embodiment of the invention described hereinafter relates to a multiplayer computer game that is played over the Internet. It should, however, be understood that the invention is not limited to the Internet and that it can be adapted to other networks. In addition, the noted embodiment of the invention only requires the player to have a web browser with the basic input/output functions (able to parse HTML version 2.0) to play the game, i.e., the player is not required to have an plug-ins or add-ons or other game related software to play the game. This aspect of the invention can also be adapted to other networks so that the player only requires a device that is functionally analogous to the noted web browser to play the game. It should be appreciated that a player's computer system may require other non-game software (device driver software, modem software and the like) that is of a general purpose nature to interact in the game.

Figure 1:
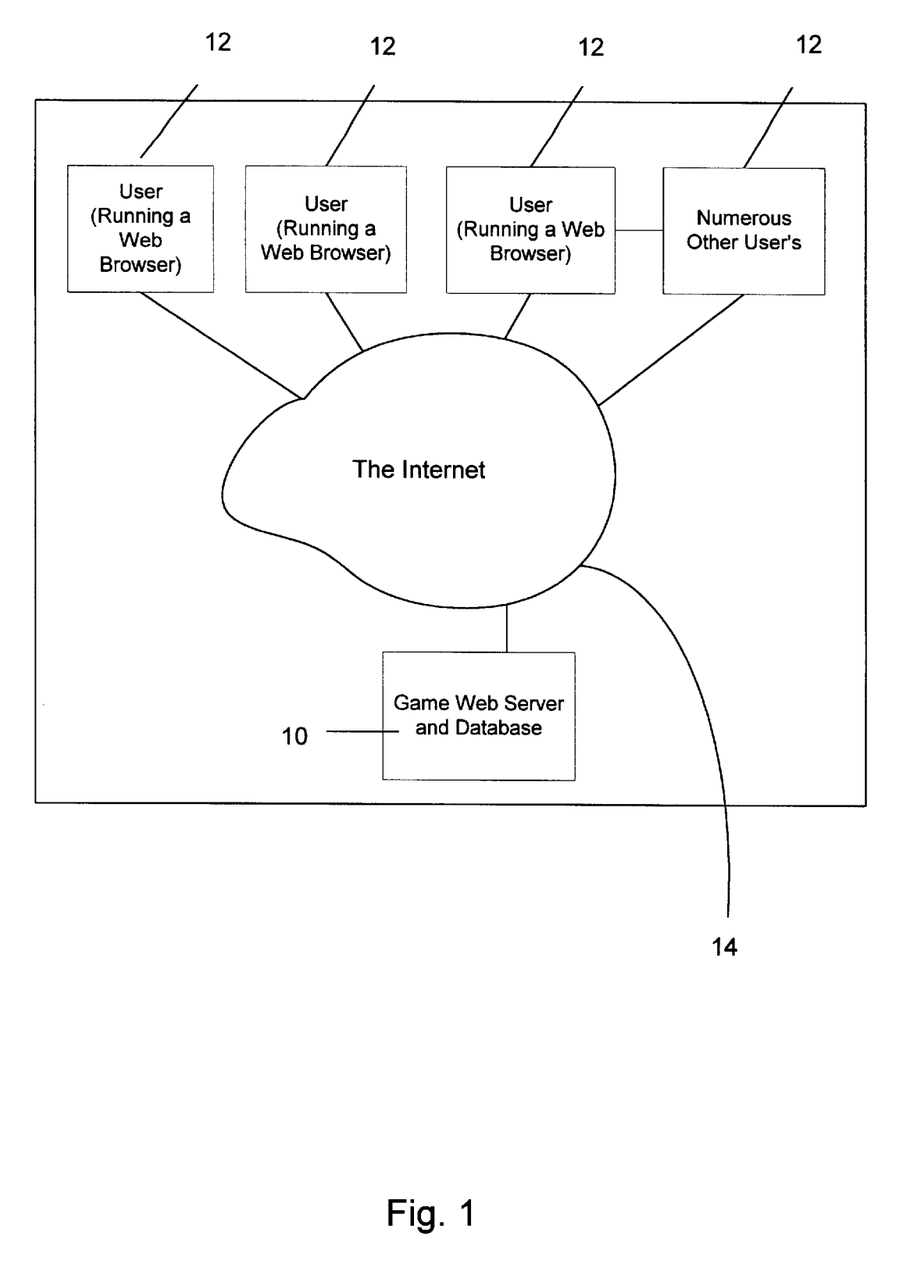
FIG. 1 depicts a block diagram or data processing architecture which is used to implement the game system of the present invention.

With reference to FIG. 1, the general Internet environment of the invention is described. A game web server and database 10, which is hereinafter referred to as game server 10, receives moves from the players, processes all the moves entered by the players to update the state of the game, and makes the updated state of the game available to the players. The game server 10 is given an Internet address prior to any players seeking to play the game. Further, the game server 10 can be comprised of several servers that cooperate with one another to conduct the game. A player computer system 12 includes an input device (such as a mouse or trackball), an output device (typically a CRT), a web browser for conveying the moves generated by the players manipulation of the input device to the game server 10 and for processing information on the state of the game so that the information can be displayed on the output device. Suitable player computer systems include PCs and Web/Internet televisions. The Internet 14 is the vehicle by which information is transferred between the player computer systems 12 and the game server 10. Typically, the player computer systems 12 utilize a telephone modem to access an Internet Access Provider, such as America On Line. The provider, in turn, accesses the Internet.

Communications over the Internet occur via data packets according a Transmission Control Protocol/Internet Protocol (TCP/IP). Further, the communications occur over a subset of the Internet that is known as the World Wide Web, hereinafter referred to as the Web. The language of the Web is Hyper Text Markup Language, hereinafter referred to as html. The html language is the language that is understood by the web browsers in the player computer systems 12. The language that is understood by the game server 10 is termed the Common Gateway Interface (CGI). In sum, communications between the game server 10 and the player computer systems 12 occurs according to the protocols supported by the Internet and, in particular, the World Wide Web.

Figure 2:
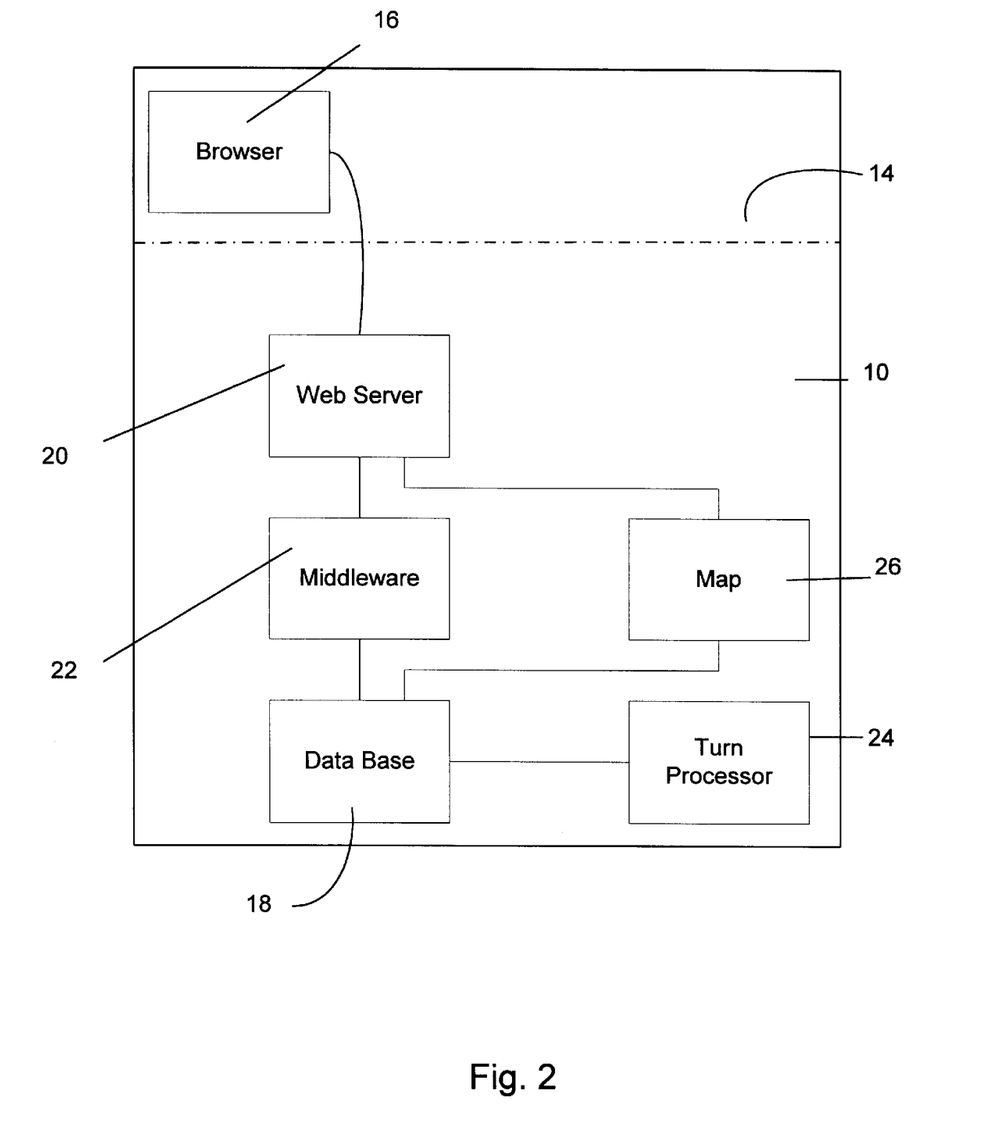
FIG. 2 is a high-level logical flow chart which depicts a programmed response of the data processing system.

With reference to FIG. 2, the player is able to interact with the game by using a browser 16 to (a) submit moves to a data base 18 within the game server 10 and (b) to receive information from the data base 18. However, in between the player and the database several layers are established to provide, among other things, a link, a graphical interface for the database, and constraints to limit the player's options to valid moves in the game.

The first layer is between the web browser 16 and a web-server 20 associated with the game server 10. The web browser 16 links to the web server 20 for the game. This link could be over telephone lines or a direct connection depending on how the user is connected to the Internet. This link allows the player to interact with the database 18. The communications between the web browser 16 and the web server 20 are according to the TCP/IP protocol.

The second layer is called the middleware 22. In the illustrated embodiment, the middleware 22 is a database management program developed by Illustra Co. This program has been chosen for the management of the database; however, other, similar programs are available for other databases. By programming this layer, it is possible to dictate the exact look of all the game's pages. This layer has the ability to translate a database record into the html descriptors that will be interpreted by the browser 16 to produce a desired display of game related information on the output device of the player computer system 12. For example, if a data base record indicates that "Fleet Bob has 6 saucers", the middleware 22 will translate this record into the appropriate html instructions for showing "Fleet Bob" on the player computer system 12.

The middleware 22 also interfaces the other direction, translating a user's clicks and keystrokes from a CGI embodiment into the appropriate database commands or format for storage of a player's moves in the data base 18. The users commands are sent to the web server 20 through a protocol called Common Gateway Interface (CGI). The middleware 22 can then update the database 18 according to the player's actions.

The third layer is a combination of the middleware 22 and internal Database functions. For example, if the web server 20 receives a command to transfer 300 saucers into fleet "Bob", then the middleware 22 can query the database 18 to see if there really are 300 saucers available. Further checking is done at the database level to check that a move is valid. It is important to note that the structure of each page of the data base 18 makes it impossible for a player to inadvertently make an illegal move. All of these layers of checking are primarily to maintain fair game play.

In the illustrated embodiment, a turn-based game is executed. To process a "turn," a turn processor 24 is employed to update all of the moves entered by the players during a predetermined period (typically on the order of hours), process all of the moves according to the rules of the game, and update the data base 18 accordingly. For example, in a game involving the conquering of planets in a virtual universe where the planets are associated with other players, the execution of a turn causes fleets to move, ships to be built, and battles be fought. The turn is actually composed of many little programs, each doing a small part of the overall turn. Some of these programs are "raw" database commands, like "move all fleets towards their destination at their maximum speed." Others, like ship production and battles are done by custom programs written in C.

Also associated with the game server 10 is a map processor 26 that is used to communicate dynamic graphic information from the game server 10 to the player computer system 12. To elaborate, the video interface by which the player views the game space is divided into a game map portion and a status portion. The game map allows the player to view the game space, while the status portion provides the player with information on their particular status within the game. The game map can be selectively scaled by the user so that the player can view various extents of the game space. For example, the player can scale the game map so that at one extreme only the adjacent game space is visible and at the other extreme substantially the entire game space is visible. The map processor 26 provides the ability to access the data base and provide the game map information to the player computer 12 with the desired scaling.

As previously noted, the invention is clearly capable of accommodating players numbering in the hundreds. Current testing has yet to find an upper limit on the number of players that can be accommodated other than self-imposed constraints. Consequently, at present, the invention is believed to capable of handling a substantially limitless number of players. Memory, processing and communication resources are added to the game server 10 as needed to accommodate more players.

Figure 3:
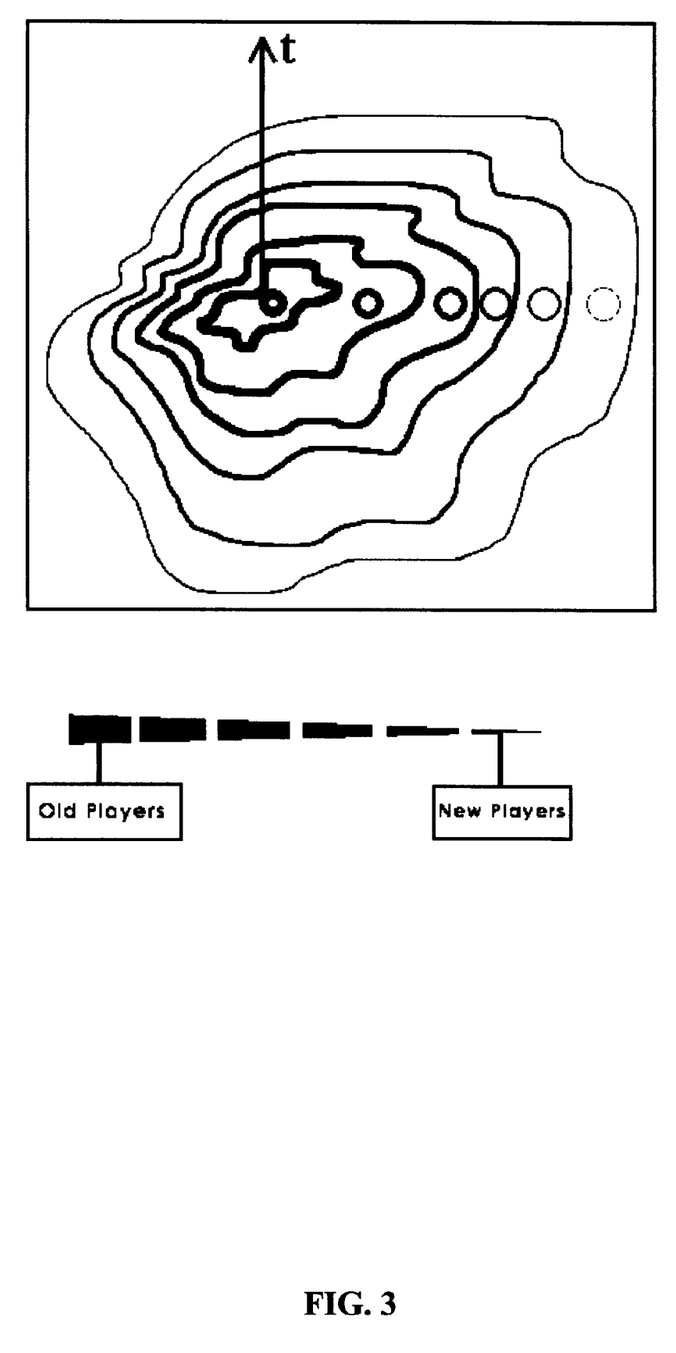
FIG. 3 shows a diagram of the persistent expanding universe that permits, for example, a strategy game that involves the acquisition of planets within a virtual universe to continually add new planets around the outside edge of the universe, thereby permitting the universe to grow indefinitely.

With reference to FIG. 3, the data base 18 and/or the management of the data base 18 possesses features that facilitate the playing of a game by a large number of players. This feature of the game can be appreciated by continuing with the example of a game based on the conquering of worlds in a virtual universe, where the worlds populating the virtual universe are associated with particular players. The worlds, which are each associated with a player, are positioned according to a convoluted density map of the virtual universe that has been defined so as to provide a uniform growth pattern of the universe as the number of players joining the game is increasing in number. In other words, The course of the universe's growth is determined according to a convoluted density map. This convoluted density map for this particular game is calculated by taking into account 4 density maps. It should be appreciated that more or less density maps can be used depending upon the desired characteristics of the game. In the noted example, the 4 density maps are:

1. a "time" map where different shades of gray represent differing times of creation. i.e. black areas are created first and lighter areas are created later;
2. a "density" map showing how densely areas of the universe should be populated with planets.
3. a "resource" maps indicating the average RER and EI values for different regions (see following example);.
4. a "new player" map indicating what areas of the universe new players will be placed in.

The map of the universe is a convolution of these 5 maps. The most recent player will be assigned to a world positioned in the outskirts of the "convoluted" universe, thus allowing future players to join the game without disturbing other players' positions in the universe and allowing the newer players to play against players with similar game resources rather than against older players who may have substantially more game resources. This architecture is one of the major advantages of this game. Indeed, the capacity for adding new players, as previously noted, is believed to be almost limitless since the only perceived limitation on increasing the number of players is the ability or desirability of adding resources to the game server 10. It should, however, be appreciated that the foregoing method for managing the data base can be adapted to a fixed game universe or space.

The operation of a turn-based game according to the foregoing is now described. Initially, it will be assumed that the game has a current state that is reflective of the individual states associated with each player of a large number of players and that this current state is reflected in the data base 18. Further, the data base 18 is managed so as accommodate a large number of players in a manner similar to that noted above. For a predetermined time period, information on the current state of the game is available to the players and the players can enter moves as described above. At the end of the predetermined period of time, the turn processor 24 prevents further moves from being entered in the data base 18, processes all of the moves entered into the data base 18 during the predetermined period of time according to the rules of the game, and updates the state of the game in the data base 18 accordingly. It should be appreciated that the game server 10 performs substantially all, if not all, of the game processing. The web browser 16 simply serves as a vehicle for allowing the player to enter moves and apprising the player of the state of the game. The browser 16 does not perform any substantial game processing, i.e. the browser 16 performs little, if any, application of game rules to the data contained the data base 18. The communications between the game server 10 and the player computer system 12 occurs over the Internet and, in many cases, through the communication system of an Internet service provider located between the Internet and the player computer system 12.

A further feature of the invention is the coupling of advertising with the playing of the game. Generally, a game is chosen that employs some kind of game currency. An advertiser can purchase game currency and a link in one or more of the data base pages that are displayed on the output device of the player computer system 12. After the user "clicks" on the link to the advertiser's page, the advertiser can transfer game currency to the player, which the player can then use in playing the game. Transfer of the currency will be accomplished by the game server 10 in response to an authorization signal from the advertiser. It is also feasible that the advertiser transfers the game currency to the player in a fashion that avoids the game server 10. To receive the currency, it is anticipated that the advertiser will require the player to do more than click on to the advertisers page. For example, the player may have to enter their name and address on a mailing list or take some action that indicates to the advertiser that its advertisement has been read by the player before the game currency is transferred to the player.

Advertiser's can also have their name associated with various game elements. For example, the advertiser's logo could be associated with a space ship that is used in playing the game.

The distribution of game currency by an advertiser may compromise the fairness of the game. To elaborate, a player may continually visit an advertisement and thereby obtain such a large amount of game currency that the fairness of the game is compromised and/or the advertiser reaches fewer than the desired number of individuals. To address this problem, the game server 10 can provide limitations on the amount of game currency that a player can receive from advertisers and/or the rate at which a player can receive game currency from advertisers.

To encourage players to peruse an advertiser's presentation on their goods/services and/or to prevent a player from obtaining an unfair advantage by controlling the rate at which a player can obtain game currency from an advertiser, it is also possible to provide the ability for the player to only occasionally receive game currency after accessing the advertiser's presentation. For example, the game currency may only periodically or randomly be available to a player who accesses the advertiser's presentation. Alternatively, the advertiser can have a drawing or lottery in which one player of a plurality of players who have accessed the advertiser's presentation is chosen to receive an amount of game currency.

The following is an example of game that is played according to many of the features noted above and discusses other features that are particular to particular game (a war game) that can be adapted to other games. A possible theme for the game is a futuristic galaxy war where one of the goals is the conquest of a maximum number of worlds inhabited by different species.

The player takes the role of a fledgling galactic warlord, entering the game with a single planet. The player's goal is to build a large and powerful empire, and this involves managing planetary resources, building military units, and conquering as many planets as possible. Entering the game for the first time, the player defines his or her in-game persona by making the following choices:

1. Screen name: the player chooses the name by which he or she will be known in the game.
2. Race: the player chooses the race which inhabits his or her starting planet, or "homeworld". Races are described in more detail below. The choice of race affects the player's initial forces and available technologies.
3. Planet name: the name of the player's homeworld.

The computer assigns the new player's homeworld a position in the game universe, and determines other necessary information. Once the player's in-game persona is established and the homeworld created, the player can begin to interact with other players and with the game itself. The player can perform any of the following actions:

1. Select and examine any planet in the game universe, viewing its planetary information (see below), the name of its current owner, an image of the planet itself, its position on the game map and the forces that are currently stationed there. Recent battles at the planet may also be reviewed on a turn-by-turn basis. If the planet is owned by the player who is viewing it, the player will also see information on the type, number and progress of all units that are currently in production there, and the status of inbound and outbound fleets.
2. Review and change the units in production at any planet owned by the player.
3. Purchase design licenses at any planet owned by the player. A planet must have a design license for a particular type of unit before it can produce that unit. Design licenses are purchased with Ultranium, a fictional resource which is the game's main currency.
4. Form units into fleets, and send those fleets to other planets. Fleets may be used to transfer resources from one world to another, or to attack planets belonging to other players, or to send units and resources to another player as part of a trade deal or treaty of cooperation.
5. View price information on every unit type in the game, including the current price and the recent history of price fluctuations.
6. View encyclopedia information on every race and unit type in the game, and help information on the game itself.
7. Read news stories added by the game's administrators, commenting on recent events in the game and setting up events and plotlines for the future.
8. Exchange email with other players, using screen names to maintain the game's immersive quality.
9. Find information on other players, such as real name and home town. Players always have the option to withhold this information if they wish to keep their privacy.
10. Enter into real-time online chat with other players.

A planet in the game is defined by its position, name, and two statistics: Environmental Index (EI) and Resource Extraction Rate (RER). A planet's EI determines the rate at which its population grows, and its RER determines how much Ultranium the planet generates each turn. Both population and Ultranium are required to produce units. Units themselves have a number of statistics, beside their name and image:

1. License cost is the cost in Ultranium to purchase a design license for one planet to produce the unit.
2. Offense is the percentage chance for the unit to hit a target with an attack.
3. Defense is the percentage chance for the unit to survive an attack which hits it.
4. Population damage is the percentage of a planet's population that is destroyed each turn when the unit is attacking a planet.
5. Attacks is the number of attacks the unit can make each turn.
6. Carry Factor, if positive, expresses how much the unit can carry, or if negative, how much carrying capacity is required to transport the unit.
7. Speed indicates how far the unit can travel in a turn, expressed in the game's abstract grid units. A fleet always moves at the speed of its slowest component unit.
8. Cost is the amount of Ultranium required to produce one unit of this type. Cost fluctuates according to demand (i.e. the more units of this type that are built in the game universe, the higher the price rises), effectively creating a virtual commodities market.
9. Complexity is an expression of the time required to produce the unit. Assuming that enough Ultranium is available, the number of turns required for a given planet to produce a single unit of this type equals Complexity/Population. Therefore, the greater the number of population, the faster is the accomplishment of a given unit.

The Command Center

The Command Center is the heart of the game's interface, and is described in some detail here because it provides a convenient means to explain the game's main functions. The Command Center is a browser window divided into two main fields: the Game Map on the left and the World Information area on the right. The player may also choose to open a chat window at the bottom of the screen.

Game Map

The game map is displayed in a window to one side of the player's command center screen. Scroll and zoom controls allow the player to view any part of the game universe at various levels of magnification. A "Find Empire" button allows the player to re-center the map on his or her own planets. Universal co-ordinates are shown at each side of the map.

Each planet is represented by an icon, whose color shows the planet's ownership (white, owned by viewing player; red, owned by another player; yellow, owned by nobody) and/or allegiance, along with the planet's name, the owner's name and a number showing the distance in grid squares from the planet which is currently selected as a reference point (see "Find on Map" in world information below). Clicking on a planet's icon displays the world information (see below) for that planet in the other part of the screen, and displays the route and current position of any of a player's fleets sent out from that planet in previous turns, that have not yet arrived at their destination.

The map is also used to select destinations for fleets. When a player chooses to deploy a fleet, a message appears at the top of the map prompting the player to choose a destination. The destination is selected by clicking on a planet, and when this is done the message disappears, the map returns to its normal functionality, and the name of the fleet's destination is displayed next to the fleet's name in the world information area.

World Information

The world information display consists of the following elements:

1. World image—selected by the computer from an image library when the world is created.
2. World name.
3. World type—some brief descriptive text such as "gas giant", "binary planet system", hyper-urban planetoid", ctc.
4. Owner's name—clicking on the name goes to a page of information on the owner, including race, number and names of planets owned, and a link to send in-game email to that player.
5. World statistics—EI and RER (see above)
6. Find on Map—if selected, centers the game map on this world. Distances are then shown relative to this planet.
7. Production—if the player controls this world, scrolls immediately down to the production queue.
8. Query—links to the relevant section of the in-game encyclopedia.
9. Fleets—displays all units currently at the planet, showing name, an icon, number, speed and carry factor. Names are links to the relevant sections of the in-game encyclopedia. Units are shown by fleet, and units which have not been assigned to a fleet are shown as a "base fleet". An ever-present button allows the player to make a new fleet. Fleets other than the base fleet also have a button to allow the player to modify a fleet's composition, and a button allowing the player to choose or change the fleet's destination; this button is available only so long as the fleet's overall carry factor is zero or greater, so that an overloaded fleet is not allowed to take off. A query button calls a help screen about fleets in the game.

10. Scanners—shows the detection range (25 grid units if the planet has no scanner, otherwise shows the range of the longest-range scanner on the planet), and information on fleets sent from the planet or coming to the planet, (all such fleets owned by the player are displayed, but those owned by other players are only shown if they are within the given detection range). This information consists of fleet name (linking to information on the fleet's composition, unless the fleet is owned by another player), a planet name (destination for outgoing fleets, origin for incoming fleets) linking to the relevant planet information, and a distance to the fleet's destination.

11. Production—presents information in table form. Each row is a single order, for a certain number of units of a single type. Columns show the unit type (with a link to the relevant section of the game's encyclopedia), the unit cost in Ultranium (updated until the order enters production, at which time the price is locked), the number ordered, and the number completed (both in total and in the most recent game turn). If an order has not been entirely completed, there is a button which allows the player to cancel the order. If there is more than one order in the production queue, the lower orders each have a button which allows the player to move an order to the top of the queue. A "New Order" button allows the player to submit a new order for production, review existing production licenses on this planet, review and information on available design license and purchase new licenses if desired, and review price information and other game statistics for all units in the game. A query button calls up a help screen about production in the game.

12. Battles—displays the number of the turn in which any recent battles took place at the planet. Each turn number links to a blow-by-blow recording of the battle, which may be replayed at will.

While the invention has been particularly shown and described with reference to a preferred embodiment, it will be understood by those skilled in the art that various changes in form or in detail may be made therein without departing from the spirit and scope of the invention.

What is claimed is:

1. A method for playing a computer game in which players can be added to the game over time and in which the object of the game is to acquire the game "space" allocated to adjacent players, the method comprising:

providing a data base for retaining a record associated with each of the players in the game;

first adding a first player to said data base, wherein said first player is initially allocated a first player game space and first player game resources that can be used in an effort to acquire the game space that is adjacent to said first player game space and is associated with one or more other players; and second adding a second player to said data base, wherein said second player is initially allocated a second player game space and second player game resources that can be used in an effort to acquire the game space that is adjacent to said second player game space and associated with one or more other players;

wherein said step of second adding includes using a predetermined parameter to locate said second player game space relative to said first player game space so that said first player does not have an unreasonable advantage relative to said second player that could lead to said second player game space and second player game resources being acquired by said first player before said second player has a meaningful opportunity to play the game.

2. A method, as claimed in claim 1, wherein:

said predetermined parameter includes time, wherein a distance between said second space and said first space increases as the amount of time that has elapsed between said step of first adding and said step of second adding increases.

3. A method, as claimed in claim 1, wherein:

said step of first adding defines a first overall game space; and said step of second adding defines a second overall game space, wherein said second game space is larger than said first game space.

4. A method, as claimed in claim 1, further comprising:

defining a fixed overall game space that remains substantially constant over time, wherein said first player game space and said second player game space are located within said fixed overall game space.

* * * * *